(12) United States Patent
Mueller

(10) Patent No.: US 8,684,149 B2
(45) Date of Patent: Apr. 1, 2014

(54) BRAKE DISK

(75) Inventor: Hans-Walter Mueller, München (DE)

(73) Assignee: Robert Bosch GmbH, Stuttgart (DE)

( * ) Notice: Subject to any disclaimer, the term of this patent is extended or adjusted under 35 U.S.C. 154(b) by 93 days.

(21) Appl. No.: 12/998,106

(22) PCT Filed: Aug. 5, 2009

(86) PCT No.: PCT/EP2009/060133
§ 371 (c)(1),
(2), (4) Date: Jul. 19, 2011

(87) PCT Pub. No.: WO2010/031635
PCT Pub. Date: Mar. 25, 2010

(65) Prior Publication Data
US 2011/0266103 A1    Nov. 3, 2011

(30) Foreign Application Priority Data
Sep. 17, 2008    (DE) .......................... 10 2008 042 165

(51) Int. Cl.
*B60T 1/06* (2006.01)

(52) U.S. Cl.
USPC .................................. 188/218 XL; 188/18 A

(58) Field of Classification Search
USPC .................. 188/18 A, 218 A, 218 R, 218 XL
See application file for complete search history.

(56) References Cited

U.S. PATENT DOCUMENTS

| | | | |
|---|---|---|---|
| 2,603,316 A | 2/1949 | Pierce | |
| 4,108,286 A * | 8/1978 | Gagarin | 188/218 XL |
| 5,823,303 A * | 10/1998 | Schwarz et al. | 188/218 XL |
| 6,564,912 B1 | 5/2003 | Koschinat | |
| 2004/0178031 A1* | 9/2004 | Gotti et al. | 188/218 XL |
| 2006/0151266 A1* | 7/2006 | Sadanowicz | 188/218 XL |
| 2008/0006492 A1* | 1/2008 | Stensson et al. | 188/218 XL |
| 2008/0011561 A1* | 1/2008 | Hopkins et al. | 188/18 A |
| 2009/0020379 A1* | 1/2009 | Hanna et al. | 188/218 XL |
| 2010/0084231 A1* | 4/2010 | Biondo et al. | 188/218 XL |

FOREIGN PATENT DOCUMENTS

| | | |
|---|---|---|
| CH | 309 388 | 8/1955 |
| CN | 101027503 | 8/2007 |
| DE | 1 575 748 | 1/1970 |
| DE | 27 28 335 | 1/1978 |
| DE | 43 32 951 | 8/1994 |
| DE | 199 18 667 | 10/2000 |
| DE | 10 2007 054 393 | 5/2009 |
| EP | 1 065 403 | 1/2001 |
| EP | 1 128 083 | 8/2001 |
| JP | 6-35690 | 5/1994 |
| JP | 2000-27906 | 1/2000 |
| WO | WO 2004/085870 | 10/2004 |

OTHER PUBLICATIONS

ISO Standard 11898-1, "Road Vehicles—Controller Area Network (CAN)—Part 1: Data Link Layer and Physical Signaling", 2003; pp. 1-6 and 1-45.

* cited by examiner

*Primary Examiner* — Christopher Schwartz
(74) *Attorney, Agent, or Firm* — Kenyon & Kenyon LLP

(57) ABSTRACT

A brake disk includes a disk chamber and a one-piece component made up of a friction ring having connecting links, a supporting ring and extensions developed on the supporting ring. In order to prevent cracking caused by tensile stresses, which may occur during the temperature increase in response to braking, recesses are developed at the transition between the supporting ring and the disk chamber.

8 Claims, 3 Drawing Sheets

BRAKE DISK

BACKGROUND OF THE INVENTION

1. Field of the Invention

The present invention relates to a brake disk, e.g., a ventilated brake disk having a friction ring and a supporting structure connected to the friction ring via connecting links, e.g., a disk chamber.

2. Description of Related Art

A ventilated brake disk is known from published German patent application document DE 43 32 951 A1, which has a friction ring and a supporting structure connected to the friction ring using connecting links. The connecting links are especially developed as pins, bolts or the like, and are positioned over the circumference of the supporting structure. The connecting links project into recesses in the circumferential wall of the friction ring. In the case of larger braking torques, there is a danger that, based on the free length of the connecting links, that is, based on the distance between supporting structure and friction ring, the connecting links, might bend and, in the extreme case, detach from their seat.

Furthermore, a brake disk is known from published German patent application document DE 10 2007 05 43 93 A1, in which the friction ring and the disk chamber are also produced of different materials, and connected using connecting links, especially pins. These known brake disks are characterized by the number of individual parts and the processing steps connected with this, and the great technical effort involved. Consequently, these brake disks are relatively costly to produce. In addition, the connecting locations of the different components each mean points of attack for corrosion and other damage.

BRIEF SUMMARY OF THE INVENTION

By contrast, the brake disk according to the present invention has the advantage that the number of components of the brake disk is reduced. In this connection, the various operations are also reduced. Supporting ring, connecting links and friction ring are able to be produced in one operation. During the casting process of the disk chamber, that is made of aluminum, the friction ring may be cast integrally with it. This reduces the costs of the various operations, and provides a possibility of producing a so-called "low-cost brake disk". Because of the special positioning of the bevels of the studs of the supporting ring, in response to the shrinking of the disk chamber made of aluminum and cast integrally, a firm connection is created, so that a transfer of the torque is enabled that is free of play. Furthermore, the leakproofness of the contact locations is also ensured, since, on account of the bevels of the studs, no gap is created during the solidification process, into which corrosion-promoting media such as salt water could penetrate. In a further operation, recesses may simply be introduced in the transition range between the supporting ring and the disk chamber, so that no tensional cracks or tensional breaks are able to occur in response to the temperature increase due to braking. The temperature expansions created in the brake disks and the supporting ring may be balanced in a simple manner via the recesses.

DETAILED DESCRIPTION OF THE INVENTION

Figure 1:
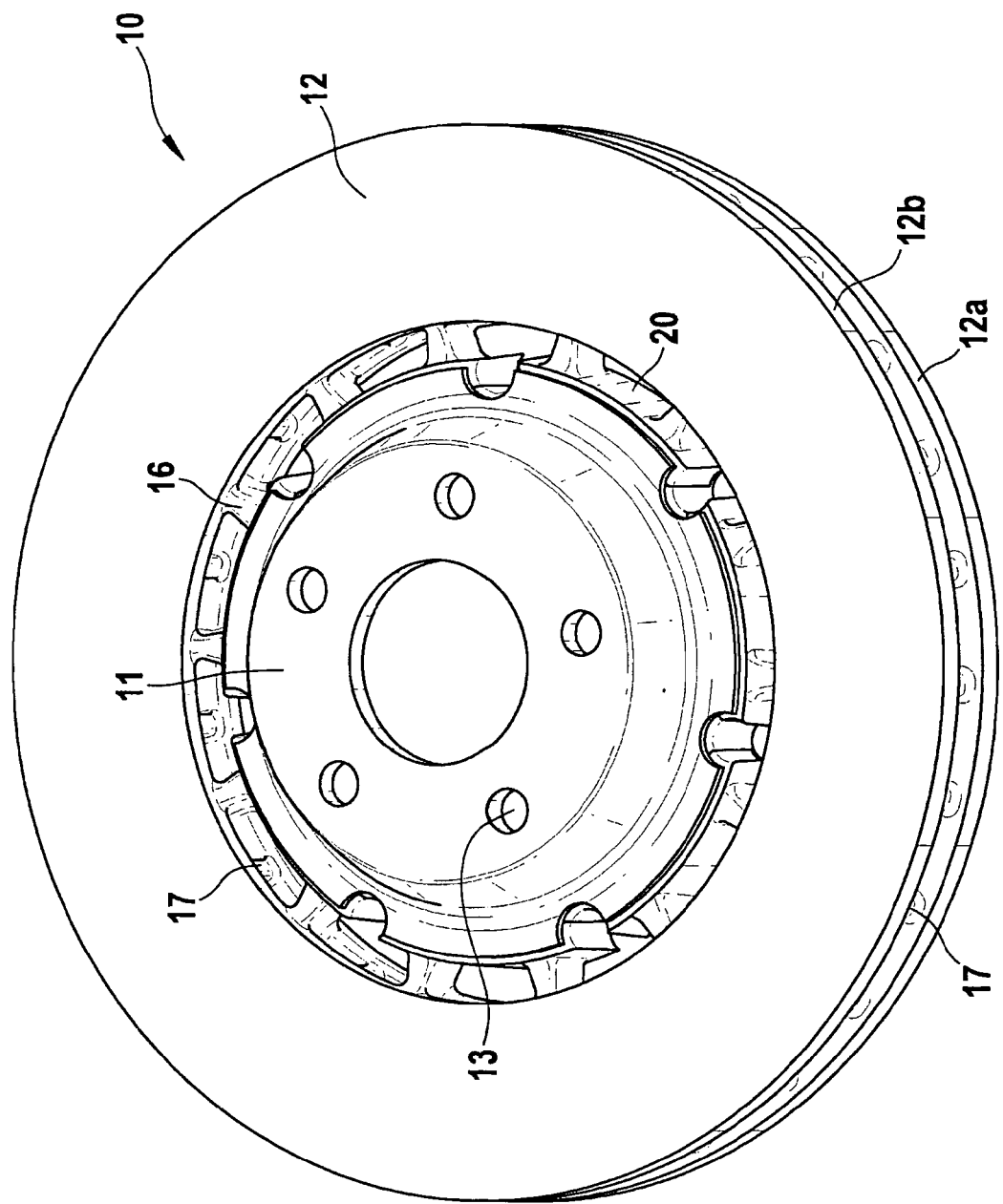
FIG. 1 shows a top view of a brake disk.
Figure 2:
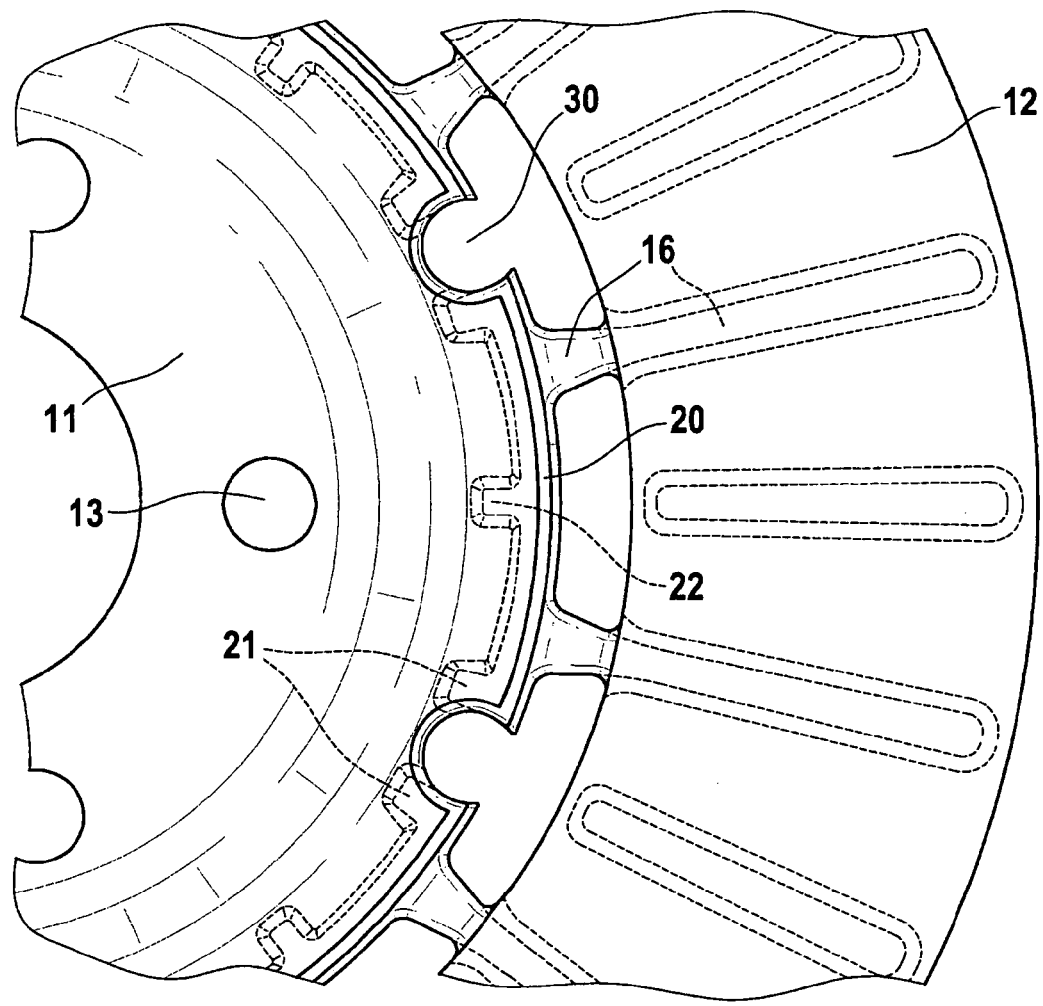
FIG. 2 shows a detailed representation of the transitional range between disk chamber and friction ring.
Figure 3:
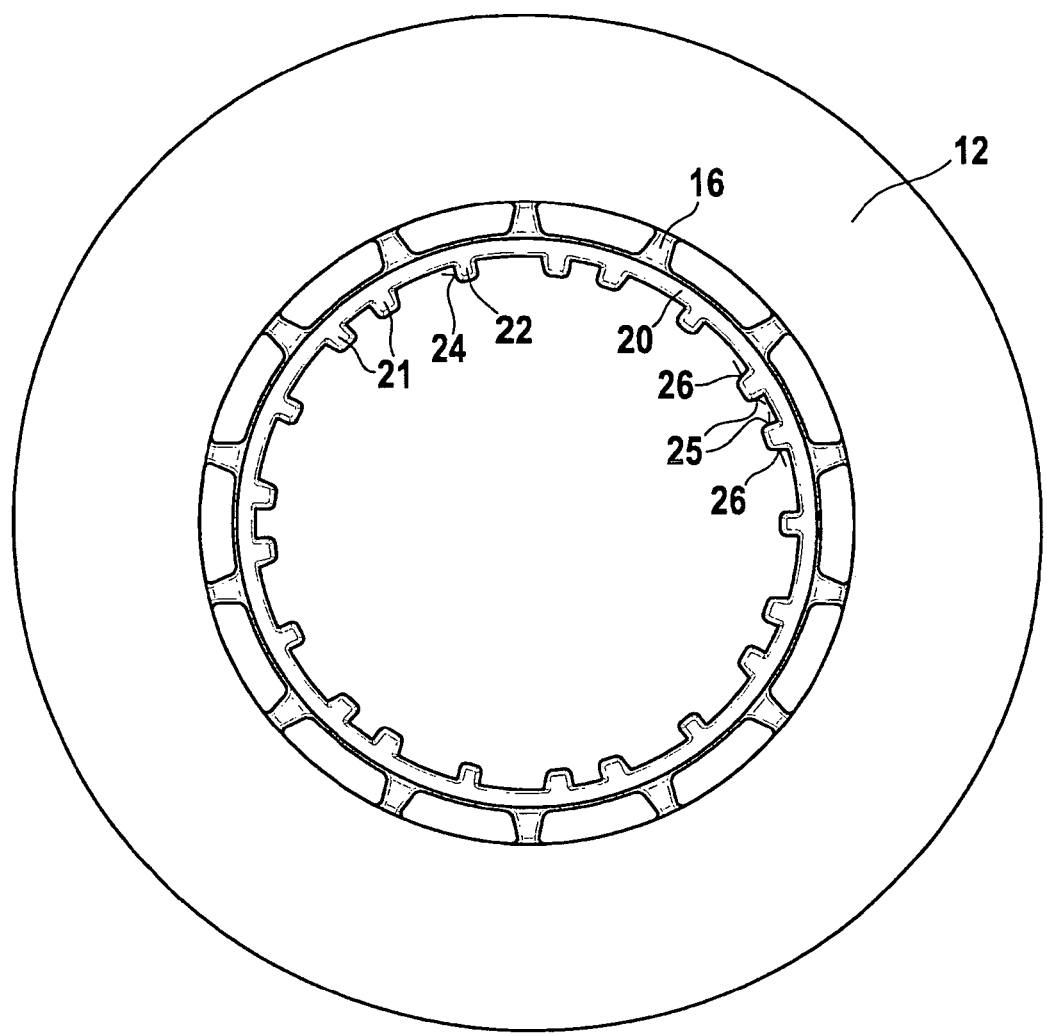
FIG. 3 shows the friction ring as an integral component with the supporting ring.

In FIG. 1, 10 designates a brake disk made up of a disk chamber 11 and a friction ring 12. A disk chamber 11 is fastened to a hub of a vehicle, in a manner not shown here, the screws for fastening it extending through boreholes 13 of disk chamber 11. Friction ring 12 is made up of two friction ring halves 12a and 12b, which are connected to each other by a plurality of crosspieces elements 17 that are distributed over the circumference and run particularly in the radial direction, so that a ventilated brake disk is created. Friction ring 12 is situated on disk chamber 11 with the aid of connecting elements 16 of a supporting ring 20 and extensions 21, 22. One integral component is represented by connecting elements 16, extensions 21, 22 and friction ring 12. This component is able to be produced in one operation. It is possible to produce the two friction ring halves 12a and 12b using the crosspieces 17 in one operation. In another operation, supporting ring 20 is produced having connecting elements 16 and extensions 21, 22, in this operation friction ring 12 being also integrally cast onto connecting elements 16. The component thus produced is illustrated in FIG. 3. Supporting ring 20, connecting elements 16 and extensions 21, 22 are made of cast iron, as is friction ring 12. By contrast, disk chamber 11 is made of aluminum. During the casting of disk chamber 11, friction ring 12 and its supporting ring 20, i.e. the component as shown in FIG. 3, is integrally cast onto disk chamber 11. In order to ensure the sealing of the mold for disk chamber 11, the axial surfaces of the supporting ring 20, that is, the end faces, are processed. In order to ensure the integral casting of supporting ring 20 and friction ring 12 onto disk chamber 11, extensions 21, 22 are developed on supporting ring 20. Extensions 21, 22 are developed at regular intervals at the inner circumference of supporting ring 20. In each case two extensions 21 are present one after the other, and then one extension 22. Extension 22 is developed approximately centrally between two successive extensions 21. Extension 22 has walls 24 that run approximately perpendicularly. Extensions 21 have a slanting wall 25 on the sides facing each other. These walls 25 may represent an undercut, for example. Walls 26 of extensions 21 facing extensions 22 are developed to be perpendicular. They have approximately the shape of walls 24 of extensions 22. Moreover, extensions 22 are situated about centrally between two connecting elements 16. The two extensions 21 are also located between two connecting elements 16, extensions 21 being located as close as possible to the area of the starting points of connecting elements 16. Extensions 22 are used to transfer the braking torque from supporting ring 20 and from friction ring 12 to disk chamber 11. It should be noted that the braking torque is transferred from friction ring 12 to supporting ring 20 with the aid of connecting elements 16. Based on their slanting walls 25, extensions 21 make it possible, after the integral casting of disk chamber 11 onto supporting ring 20, during the cooling of the material, i.e. the aluminum, that shrinking of the aluminum of disk chamber 11 onto the cast iron of supporting ring 20 takes place. This prevents the radial relative motion of disk chamber 11 and supporting ring 20 with respect to each other. Consequently, a transfer of torque, that is free of play, is ensured from supporting ring 20 to disk chamber 11. Slanting walls 25 of extensions 21, in this context, are developed and aligned to the shrinking process in such a way that during the shrinking of the aluminum, during its solidification, no gaps are able to be created, into which corrosion-promoting media, such as salt water, are able to penetrate during the operation of the brake. Furthermore, as may be seen in FIG. 2, recesses 30 are developed between extensions 21. These recesses 30 are developed in an additional operation, after the integral casting of disk chamber 11 onto supporting ring 20, and after the complete cooling of the aluminum. These recesses 30 may be produced as bores, for example. These recesses 30 have the task of balancing thermally caused, different expansions between the material of disk chamber 11 and the material of supporting ring 20. Heat is created in friction ring 12 during braking, which is also transferred to supporting ring 20 via connecting elements 16. In the process, friction ring 12 expands somewhat. If supporting ring 20 could not expand because of recesses 30, tensile stresses would occur which could lead to the cracking of supporting ring 20.

What is claimed is:

1. A brake disk, comprising:
   a friction ring including:
      a main ring body;
      an interior supporting ring spatially separated from, and concentrically interior to, the main ring body; and
      multiple connecting parts extending from the main ring body to the interior supporting ring; and
   a supporting structure situated concentrically interior to the interior supporting ring;
   wherein the friction ring is positioned on the supporting structure via the interior supporting ring, and wherein the interior supporting ring is fastened to the supporting structure.

2. The brake disk as recited in claim 1, wherein the interior supporting ring has first extensions and second extensions directed centripetally and positioned along an inner circumference of the interior supporting ring.

3. The brake disk as recited in claim 2, wherein the first extensions each have at least one slanting wall.

4. The brake disk as recited in claim 3, wherein the second extensions each have perpendicular walls.

5. The brake disk as recited in claim 4, wherein the first and the second extensions are positioned at regular intervals on the inner circumference of the interior supporting ring.

6. The brake disk as recited in claim 5, wherein two first extensions are situated between two adjacent connecting parts, and wherein one second extension is situated between two adjacent connecting parts.

7. The brake disk as recited in claim 5, wherein at least one recess is provided at the transition between the interior supporting ring and the supporting structure.

8. The brake disk as recited in claim 5, wherein the supporting structure is made of aluminum, and the friction ring is made of cast iron.

* * * * *

UNITED STATES PATENT AND TRADEMARK OFFICE
CERTIFICATE OF CORRECTION

PATENT NO.       : 8,684,149 B2  
APPLICATION NO. : 12/998106  
DATED            : April 1, 2014  
INVENTOR(S)      : Hans-Walter Mueller Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 233 days.

Signed and Sealed this

Twenty-ninth Day of September, 2015

Michelle K. Lee
*Director of the United States Patent and Trademark Office*